June 21, 1938.   S. F. ANDERSON   2,121,065
FORMATION AND PACKAGING OF MATERIAL
Filed Oct. 19, 1934   4 Sheets-Sheet 1

INVENTOR
Swan F. Anderson
Chindahl, Parker, Carlson
ATTORNEYS

June 21, 1938.　　　　S. F. ANDERSON　　　　2,121,065
FORMATION AND PACKAGING OF MATERIAL
Filed Oct. 19, 1934　　　　4 Sheets-Sheet 2
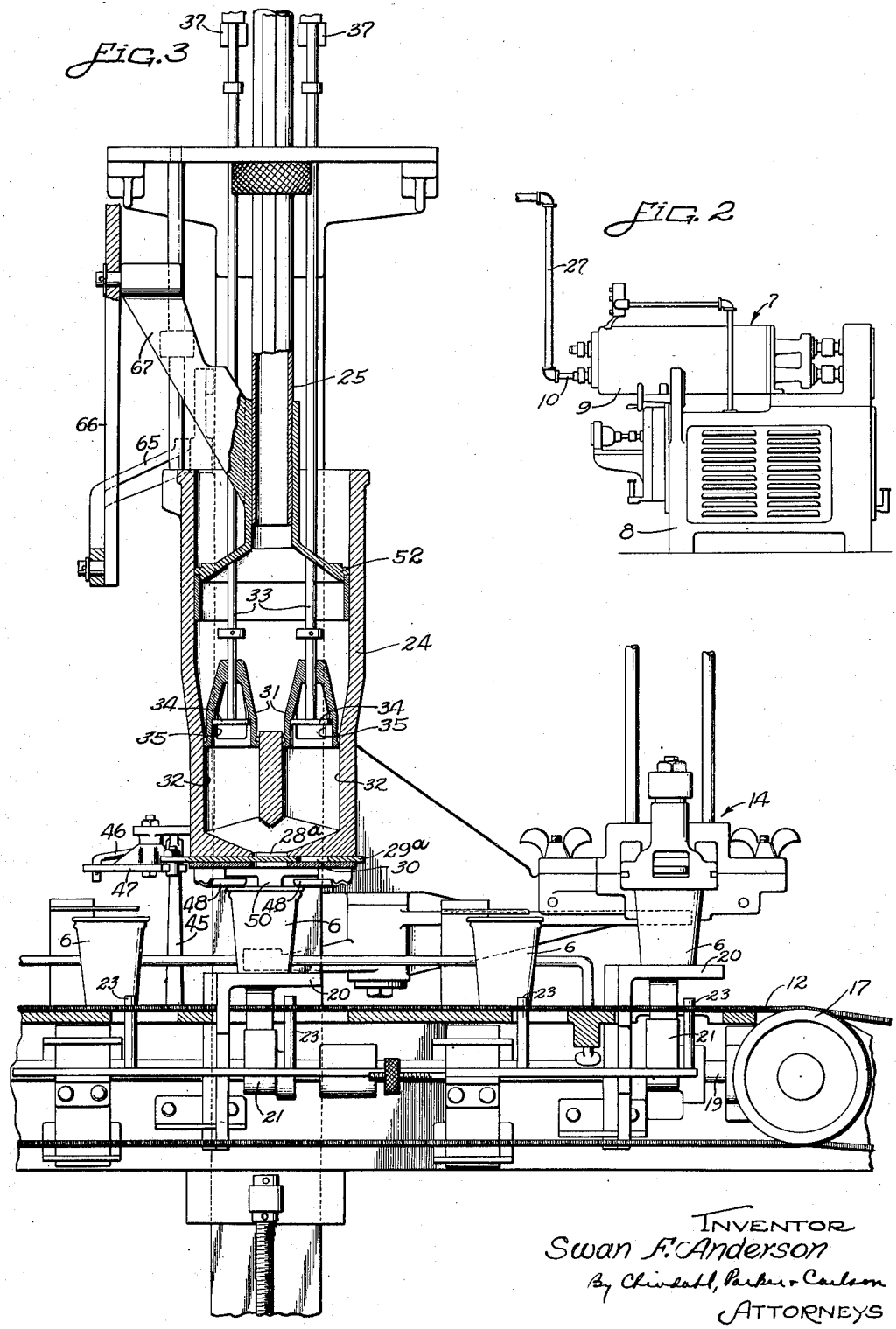
INVENTOR
Swan F. Anderson
By Churchill, Parker & Carlson
ATTORNEYS

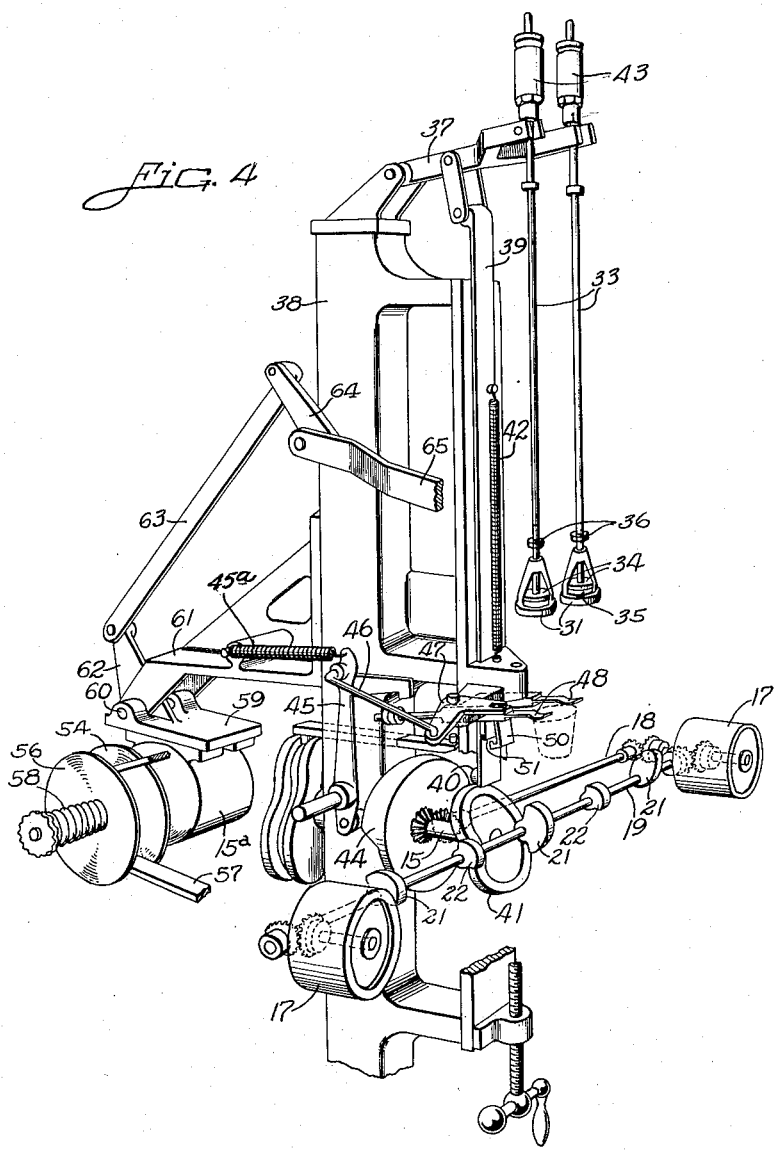

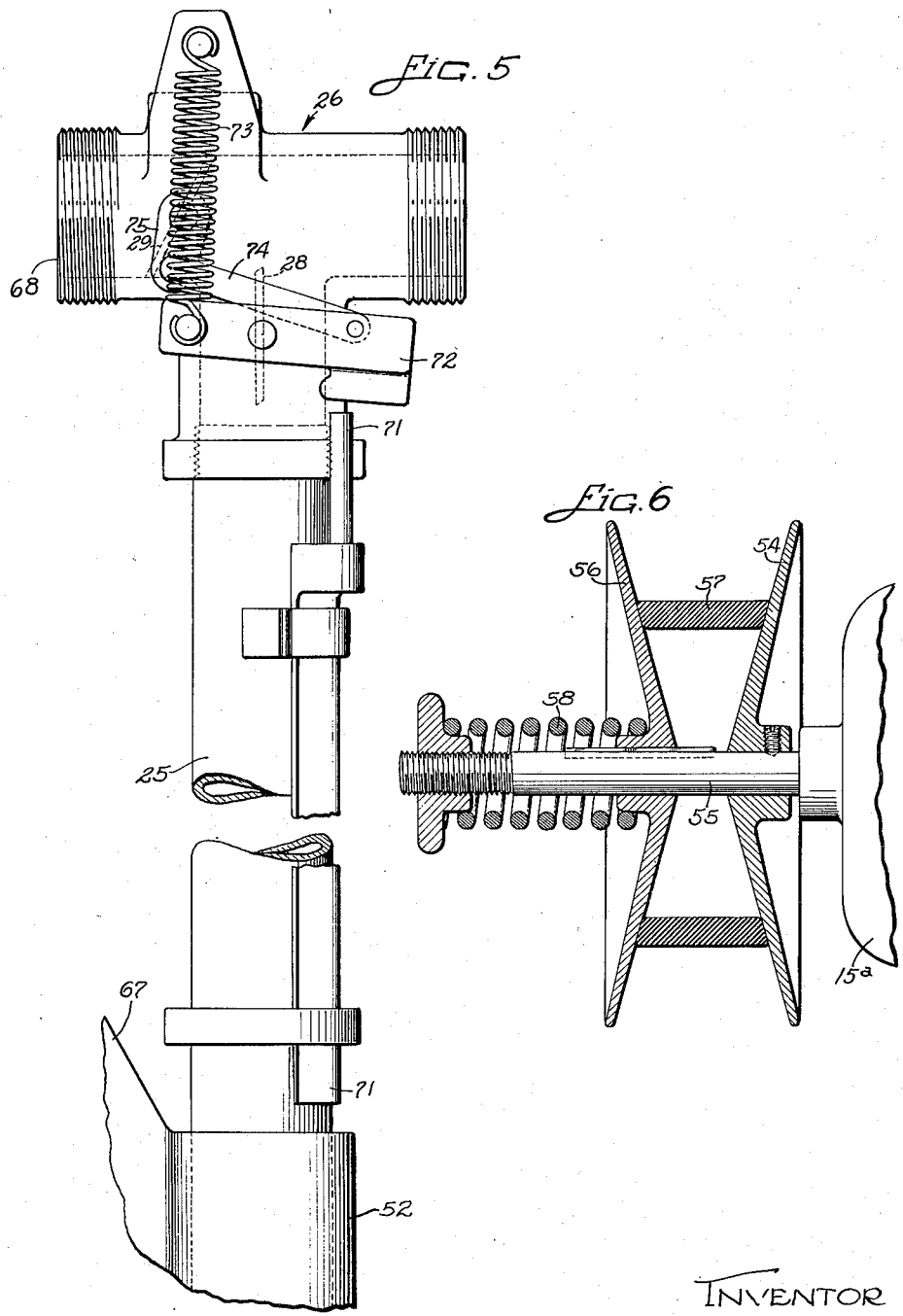

Patented June 21, 1938

2,121,065

UNITED STATES PATENT OFFICE 2,121,065

FORMATION AND PACKAGING OF MATERIAL

Swan Friteof Anderson, Rockford, Ill.

Application October 19, 1934, Serial No. 749,019

19 Claims. (Cl. 226—107)

The invention relates generally to the formation and packaging of liquid or semi-liquid materials and has more particular reference to the handling of material such as partially frozen ice cream which, when formed in a freezing machine of the so-called continuous type, is delivered at a somewhat variable rate of flow.

The primary object of the invention is to provide for synchronization in the operations of a material forming machine such as an ice cream freezer and a packaging machine such as a filler for dispensing measured quantities of ice cream into containers.

The invention also resides in the novel character of the method and the machine for synchronizing the two operations above referred to.

Another object of my invention is to provide an improved method and apparatus for packaging ice cream delivered at a continuous rate from a freezer so that the ice cream is continuously maintained under pressure until it is dispensed into suitable packages or the like, thus improving the consistency and quality thereof.

Another object is to provide novel means for collecting the surplus of material which may accumulate during a period of forced inactivity of the filling or packaging machine.

Other objects and advantages of the invention will become apparent from the following detailed description taken in connection with the accompanying drawings, in which Figure 1 is a perspective view of an ice cream packaging machine incorporating features of the present invention.

Fig. 2 is an elevational view of an ice cream freezer adapted for use with the mechanism shown in Fig. 1.

Fig. 3 is a fragmentary front elevational view showing part of the filling mechanism in vertical section.

Fig. 4 is a skeleton view showing in perspective the main operating parts of the filling machine.

Fig. 5 is a fragmentary elevational view of a by-pass valve used in conjunction with the invention.

Fig. 6 is a sectional view through the speed controlling mechanism of the filling machine.

Figure 1:
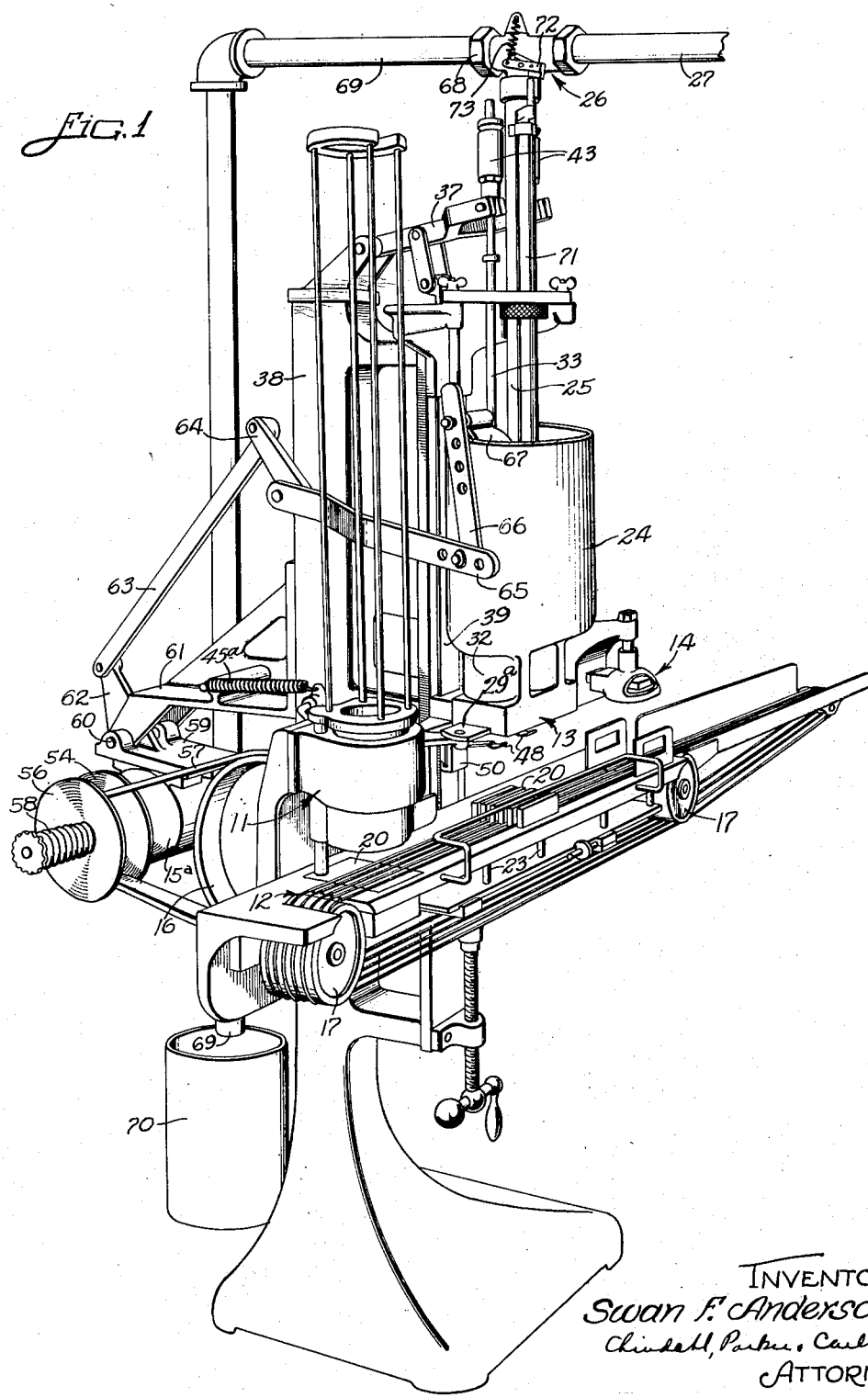

Generally stated, the invention contemplates coordinating the operation of a machine such as an ice cream freezer 7 with a packaging machine such as a filler so that regardless of variations in the rate of delivery of ice cream from the former machine, its entire output will be handled by the latter machine. In the form selected for purposes of illustration, such synchronization is effected by detecting variations in the rate of delivery of partially frozen ice cream by the freezer and adjusting the speed of operation of the filling mechanism in a direction and by an amount sufficient to compensate for such variations.

The freezer is of the so-called continuous type having an electric driving motor within a base 8 arranged to operate the actuating mechanism within the freezing chamber provided by a casing 9. The partially frozen ice cream in a semi-liquid state is discharged in a continuous flow or stream although at a somewhat variable rate through an outlet 10.

The packaging machine shown is of the type disclosed in my co-pending application Serial No. 635,482, filed September 30, 1932, and comprises generally mechanism 11 for dispensing cups 6 onto a traveling conveyor 12 by which the cups are presented to a filling mechanism 13 and thereafter carried to a mechanism 4 in which caps are applied to the filled cups. All of these mechanisms are mounted on a common frame structure and are actuated from a main drive shaft 15 (Fig. 4) driven by an electric motor 15ᵃ through the medium of speed control mechanism later to be described and a pulley 16 having a suitable speed reduction connection (not shown) with the shaft.

The conveyor 12 comprises a series of spaced endless belts extending around drums 17 which are driven from the main shaft 15 through the medium of shafts 18 and 19 and bevel gearing suitably connecting the shafts. At each operating station, the successive cups are elevated above the conveyor and presented to the mechanism to operate thereon by platforms 20 mounted to slide vertically on the machine frame and having parallel upwardly opening grooves receiving the conveyor belts as the platforms are elevated. The platforms for the different operating mechanisms are raised and lowered by cams 21 acting on the follower projections on the undersides of the platforms. Cams 22 also carried by the shaft 19 operate in proper timed relation to the filling mechanism to project stop fingers 23 above the conveyor and thereby interrupt the movements of the cups along the conveyor in proper position relative to the filling mechanism.

Mounted above the platform at the filling station is a hopper 24 of small capacity into which the partially frozen ice cream delivered by the freezer is discharged by an upright pipe 25 communicating at its uppermost end with a by-pass valve 26 communicating with the freezer outlet 10 through the medium of a conduit 27. Normally, the valve members 28 and 29 of the by-pass valve are positioned to establish communication between the pipes 25 and 27 so that the entire output of the freezer is discharged downwardly into the hopper. At its lower end, the hopper converges to an outlet opening 28ª controlled by a valve slide 29ª so that when an opening 30 in the latter is in register with the hopper opening, cream from the hopper will be dispensed downwardly into the container then supported upon the elevated filler platform 20.

Ice cream in measured quantities may be dispensed by any suitable means. Herein this means comprises plungers 31 reciprocable vertically in cylinders 32 at the lower end of the hopper 24. Each plunger has a stem 33 having a disk 34 thereon which cooperates with the plunger to form a valve for permitting the flow of cream from the upper portions of the hopper into the cylinders 32 when the stems 33 are raised relative to the plungers proper as shown in Fig. 3 thereby uncovering openings 35 in the plungers. In the downward movement of the stems, stops 36 thereon engage the plungers after the disks have passed below the openings 35, so that in the subsequent downward movement, the plungers and the disks act as pistons to force the cream through the hopper outlet or orifice 28ª. At their upper ends the plunger rods 33 are connected to the forwardly projecting end of an arm 37 pivoted on an upright standard 38 of the machine frame. Intermediate its ends, the arm 37 is connected to a bar 39 mounted for endwise vertical reciprocation and having at its lower end a roller 40 which constitutes the follower for a cam 41 fast on the main shaft 15. A spring 42 and weights 43 on the rods 33 constantly urge the plungers downwardly.

Also mounted on the shaft 15 is a cam 44 which operates on a follower lever 45 biased to a position of engagement with the cam 44 by a spring 45ª and connected by a link 46 to a bell crank 47 by which the valve slide 29ª is reciprocated back and forth between closed position (Fig. 3) and open position. The cams 21, 41 and 44 are all shaped relative to each other so that the valve slide and the cream dispensing means will be operated while the cup to be filled is held in elevated position beneath the hopper outlet. To prevent operation of the dispensing means in the event that there is no cup in filling position at the time when the plungers are actuated, feeler arms 48 are pivoted beneath the hopper in position to be engaged by a cup being elevated to filling position. In the event that the presence of a cup is detected, a latch 50 on the feeler arm moves out from beneath a shoulder 51 on the slide bar 39 permitting downward movement of the latter. In the event that there is no cup in filling position, the latch engages the shoulder and prevents downward movement of the plungers.

The mechanisms thus far referred to are fully described in the aforesaid co-pending application and more detailed description herein is unnecessary. It is sufficient to say that during each revolution of the main operating shaft 15, a cup to be filled is raised and held in filling position while the valve slide 29ª and dispensing mechanism operates to cause a measured quantity of the cream to be discharged into the cup. Then when the platform 20 is lowered, the filled cup is moved by the conveyor to the capping station.

Means is provided for detecting automatically variations in the rate of delivery of the partially frozen cream by the freezer 7. In the present instance, this means comprises a float or piston 52 received in the upper cylindrical end of the hopper 24 and slidably supported by the inlet pipe 25 so as to be free to ride up and down as the cream level in the hopper varies.

It will be seen that when the rate of delivery of the cream to the hopper is equal to the rate at which the cream is being dispensed from the hopper into the cups, the rider 52 will remain at a substantially constant level. When, however, the rate of delivery of cream increases, the rider will rise in the hopper, and similarly, will fall when the rate of cream delivery decreases below the rate of withdrawal.

The present invention contemplates synchronization of the operations of the freezer and filler mechanisms by varying the speed of operation of the filling mechanism in accordance with variations in the rate of delivery of cream by the freezer as evidenced by changes in the vertical position of the rider 52. To this end, the movements of the rider are communicated to suitable mechanism by which the speed of rotation of the drive shaft 15 by the motor 15ª may be varied progressively.

In the present instance, the speed regulation is effected through the medium of a mechanical speed change device comprising a conical disk 54 fast on the shaft 55 of the motor 15ª and cooperating with a similarly shaped disk 56 to form a V-shaped drive pulley for a belt 57 extending around the pulley 16. The disk 56 is urged by a spring 58 toward the disk 54 so that by moving the motor shaft 55 toward and away from the axis of the pulley 16, the effective diameter of the drive pulley may be increased and decreased progressively. To permit of such movement, the motor 15ª is secured to a bracket 59 pivoted at 60 on an extension 61 of the machine frame.

Rigid with the bracket 59 is an upstanding arm 62 connected by a link 63 to one arm of a bell crank 64 having a second arm 65 pivotally connected by a link 66 to an upstanding arm 67 rigid with the rider 52. Holes may be provided in the arm 65 and the link 66 to permit the effective length of the linkage between the rider and the motor bracket to be adjusted. With the parts thus arranged, it will be apparent that as the rider 52 rises, the motor shaft will be swung forwardly increasing the effective diameter of the drive pulley and therefore the rate at which cups will be filled. Conversely, when the rate of delivery of cream to the hopper 24 decreases below the rate at which cream is dispensed from the hopper, the rider 52 will fall and the motor mounting will be shifted in a direction to decrease the effective diameter of the drive pulley thereby slowing down the filling mechanism sufficiently to compensate for the decrease in the rate of delivery of cream by the freezer. The weight of the rider 52 and the adjustment of the parts are such that the tendency of the rider to fall substantially balances and preferably slightly overcomes the tendency of the disks 54 and 56 to move toward each other under the action of the spring 58. The rider thus rises and falls with changes in the level of the cream within the hopper and adjusts the speed of the filling mechanism by amounts sufficient to compensate for variations in the rate of cream delivery by the freezer. In this way, the operations of the freezing and filling mechanisms are synchronized accurately. This unbalanced weight of the rider or piston 52 also serves to maintain the ice cream or similar material in the receptacle 24 constantly under pressure. It will be noted that the ice cream is supplied from the freezer 9 to the cups 6 through a closed conduit system. By so maintaining the ice cream in this system constantly under pressure the quality and consistency of the ice cream is materially improved and closely approximates that of hand-packed ice cream.

In the event that there is an unavoidable interruption in the operation of the filling mechanism which might be caused, for example, by exhaustion of the supply of cups, means is provided for directing the accumulating surplus of ice cream into a separate receptacle. To this end, the by-pass valve 26 has an outlet 68 leading through a conduit 69 to an overflow receptacle 70, and means 28 and 29 to connect the pipes 27 and 69 and thereby divert the accumulating surplus into the receptacle 70 when the rider 52 rises to a predetermined level. This means includes a rod 71 mounted on the pipe 25 for vertical sliding movement with its lower end disposed in the path of the rider 52 (Fig. 5). Disposed outside of and pivoted on the casing of the by-pass valve is a lever 72 fast on the rock shaft supporting the valve member 28 with its free end disposed in the path of the upper end of the rod 71. Normally, the lever 72 is urged by a spring 73 into the position shown in Fig. 5 in which the valve member 28 is disposed in open position. In this position of the lever, the valve member 29 is held in closed position through the medium of a link 74 connecting the lever 72 with an arm 75 fast on the rock shaft carrying the valve member 29. With the parts thus positioned, the conduit 27 is connected to the pipe 25 and the by-passage through the conduit 69 is closed by the valve member 29. As the lever 72 is raised by the bar 71, the valve member 28 is moved toward closed position and the valve member 29 simultaneously moved toward open position, thereby diverting a portion of the cream into the overflow receptacle 70. If the interruption of the filler operation continues for a sufficient length of time, the entire output of the freezer may be diverted, but ordinarily the operation of the freezer would be interrupted in the event of such a prolonged delay in the operation of the filling mechanism.

From the foregoing, it will be apparent that provision has been made for accurate synchronization of the filling and freezing mechanisms so that, in spite of the variations which may occur in the output of the freezer, this output may be handled by the filling mechanism without danger of wasting any portion of the ice cream. Moreover, waste is avoided in the event that there is an unavoidable interruption in the filler operation. The mechanisms employed are simple and inexpensive in construction, reliable in operation, and can be cleaned conveniently and readily maintained in a sanitary condition.

I claim as my invention:

1. The combination with a machine operable to deliver semi-liquid material in a continuous flow but at a variable rate, a receptacle into which the material delivered by said machine is discharged, filling mechanism for dispensing measured quantities of material periodically from said receptacle, means operating in timed relation to said filling mechanism to present containers one by one into operative association with said mechanism for receiving the successive quantities of material dispensed thereby, common driving means for actuating said filling mechanism and container advancing means, a detector arranged to ride up and down with changes in the level of material within said receptacle, and means responsive to the vertical movements of said detector to change the speed of said driving means in progressively varying increments.

2. The combination with a machine adapted to discharge semi-liquid material in a continuous flow, of a cup filling mechanism connected to the machine and including means for moving said material with an intermittent motion to fill cups, means for holding the material received from the machine during the intervals between said intermittent movements of material into said cups, and means responsive to the quantity of material in said last named means for regulating the operation of said filling mechanism so as to make the sum of the quantities of material moved by said intermittent movements in a unit of time equal to the quantity of material received from said machine during that unit of time.

3. The combination with a machine adapted to discharge semi-liquid material in a continuous flow, of a receptacle into which the output of said machine is discharged, power driven mechanism operating to dispense measured quantities of material from said receptacle, and means responsive to variations in the rate of delivery of material by said machine to vary the speed of operation of said mechanism in progressively varying increments.

4. The combination with a machine adapted to discharge semi-liquid material in a continuous flow, a receptacle adapted to receive material delivered by said machine, means operating to dispense measured quantities of material periodically from said receptacle, means responsive to variations in the level of the material in said receptacle to regulate the speed of operation of said dispensing mechanism whereby to synchronize the operation of said machine and dispensing means; a second receptacle, and means operable to detect a rise in the level of the material in said first receptacle above a predetermined point and operating in response to such rise to by-pass at least a part of the material delivered by said machine into said second receptacle.

5. In combination with a machine for delivering liquid in a continuous flow, a receptacle, a conduit for conveying liquid from said machine into said receptacle, a second receptacle, a by-pass valve movable to establish communication selectively between the machine and one or the other of said receptacles, means operable to withdraw liquid from said first receptacle, and means responsive to changes in the level of the liquid in said first receptacle to control the operation of said valve whereby to divert a portion of the liquid delivered by said machine into said second receptacle when the level in said first receptacle rises above a predetermined point, and to terminate the diversion when the level in the first receptacle falls below the predetermined point.

6. The combination with a machine for delivering material in a substantially continuous flow having an outlet through which the material is discharged, of a filling mechanism, a hopper in said mechanism normally receiving the material discharged from said outlet, a by-passage adapted for communication with said outlet, a valve controlling said by-passage, means for dispensing the material from said hopper into containers, a variable speed drive mechanism for said dispensing means, and means in said hopper for regulating the speed of said drive mechanism and for controlling said by-pass valve.

7. The combination with a machine operable to deliver liquid material such as partially frozen ice cream in a continuous flow but at a variable rate, a receptacle into which the material delivered by said machine is discharged, mechanism for dispensing measured quantities of the material periodically from said receptacle, means operating in timed relation to said mechanism to present containers one by one into operative association with said mechanism for receiving the successive quantities of material dispensed thereby, common driving means for actuating said mechanism and container advancing means, a detector arranged to ride up and down with changes in the level of the material within said receptacle, and means responsive to the vertical movements of said detector to change the speed of said driving means, in progressively varying increments.

8. The combination of a machine for delivering liquid material in a continuous flow having power driving mechanism, a receptacle for receiving the liquid delivered by said machine, a filler operable to withdraw measured quantities of the liquid periodically from said receptacle, power driving mechanism for actuating said filler, means operable to detect rises and falls in the level of the liquid in said receptacle, and means responsive to the movement of said detecting means to vary the speed of operation of one of said power driving mechanisms in a manner to maintain a substantially constant level of the liquid in said receptacle.

9. In combination with a receptacle, means for delivering material to said receptacle in a substantially continuous flow but at a variable rate, means operating periodically to withdraw measured quantities of material from said receptacle, power driving means for actuating said withdrawing means including a member movable in opposite directions to vary progressively the rate of withdrawal of the material from said receptacle, a member arranged to detect variations in the amount of material contained in said receptacle, and means connecting said members and operating to cause movement of the first mentioned member in accordance with the movements of the second member.

10. The combination of mechanism for delivering liquid material in a continuous flow but at a variable rate, power driven means for actuating said mechanism, mechanism for receiving the liquid from said first mentioned mechanism and operating intermittently for packaging the material, power driving means for actuating said packaging mechanism, means arranged to detect variations in the amount of material between said mechanisms, and means controlled by said last mentioned means to govern the speed of operation of one of said power driving means and maintain a substantially constant amount of material between said mechanisms.

11. The combination with a machine for delivering a continuous stream of liquid but at a variable rate, of a filling machine, storing means in said filling machine adapted to receive the liquid discharged from said first named machine, means for dispensing the liquid so stored into containers, a variable speed drive mechanism for said dispensing means, and means responsive to the quantity of liquid in said storing means for regulating the speed of said drive mechanism in direct proportion to the quantity of liquid in said storing means.

12. The combination with mechanism for delivering material in a continuous flow but at a variable rate, of means operating to package said material in measured quantities, and means responsive to variations in the rate of delivery of said material by said mechanism to vary the speed of operation of said packaging means in progressively varying increments.

13. In combination with an ice cream freezer operable to deliver partially frozen ice cream in a continuous flow, a receptacle, means forming a closed passage having an inlet and an outlet for conveying ice cream from said freezer to said receptacle, filling mechanism for dispensing measured quantities of ice cream intermittently from said receptacle, and means including a piston slidably mounted for reciprocation in said receptacle for maintaining said ice cream in said receptacle under continuous pressure.

14. The combination of continuously operating power actuated mechanism for forming and delivering semi-fluid ice cream in a continuous flow, a closed chamber receiving the ice cream from said mechanism, intermittently operating power actuated mechanism for withdrawing measured quantities of the ice cream from said chamber, and means for varying the speed of one of said mechanisms to maintain the ice cream in said chamber continuously under pressure.

15. The method of forming and packaging ice cream as a continuous process which comprises supplying semi-fluid ice cream in a continuous flow, conveying the semi-fluid ice cream to a closed chamber in an uninterrupted stream, intermittently withdrawing measured quantities of the ice cream from said chamber, and varying the frequency of such withdrawal to maintain the ice cream in said chamber continuously under pressure.

16. The method of forming and packaging ice cream as a continuous process which comprises supplying semi-fluid ice cream in a continuous flow, conveying the semi-fluid ice cream to a closed chamber in an uninterrupted stream, intermittently withdrawing measured quantities of the ice cream from said chamber, and varying the frequency of such withdrawal to substantially equalize the average rate of said withdrawal with the rate of formation and maintain the ice cream in said chamber continuously under pressure.

17. The combination with mechanism for delivering material in a continuous flow but at a variable rate, of means operating to package in measured quantities said material delivered thereto by said delivery means at said variable rate, and means responsive to variations in the rate of delivery of said material by said mechanism to vary the speed of operation of said packaging means to compensate for such variations in the rate of delivery.

18. The combination with mechanism for delivering material in a continuous flow but at a variable rate, of means providing a closed chamber receiving said material including a reciprocable piston movable back and forth in response to changes in the volume of material in said chamber and urged in a direction to compress the material, means for intermittently withdrawing measured quantities of said material from said chamber, and means responsive to the movement of said piston to by-pass material out of said chamber when the volume thereof exceeds a predetermined value.

19. The combination with mechanism for delivering material in a continuous flow but at a variable rate, of means providing a closed chamber receiving said material including a cylinder and a piston reciprocable therein and urged in a direction to maintain the material in said chamber under pressure, filling mechanism by which measured quantities of said material may be withdrawn from said chamber, and a normally closed by-passage adapted to be connected automatically to said chamber in the movement of said piston to a predetermined position by an increase in the quantity of material in the chamber.

SWAN FRITEOF ANDERSON.